United States Patent Office
2,933,520
Patented Apr. 19, 1960

2,933,520

ADDITION PRODUCTS OF PHENOLS AND KETO ACIDS AND DERIVATIVES OF THE SAME

Alfred R. Bader, Milwaukee, Wis., assignor, by mesne assignments, to S. C. Johnson & Son, Inc., Racine, Wis., a corporation of Wisconsin No Drawing. Application August 27, 1953
Serial No. 377,002

11 Claims. (Cl. 260—473)

This invention relates to a method for the preparation of novel phenolic compounds and it has particular relation to the manufacture of di(hydroxy-aromatic) alkylidene carboxylic acids through substitution of hydroxy aromatic groups for the keto oxygen in a keto carboxylic acid.

Alkylidene bisphenols of the structure

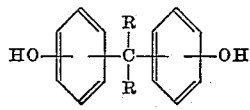

where R and R are hydrocarbon or substituted hydrocarbon or hydrogen, have been prepared by reacting a phenol with a ketone or an aldehyde. Such compounds as bis-(4-hydroxyphenyl)2, 2-propane, which possess the structure:

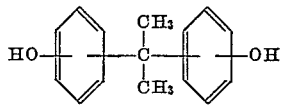

are prepared in this manner.

These compounds are capable of condensing with epichlorohydrin to form long chain polyethers which constitute valuable resins. They are understood to include molecules approximately of the structure:

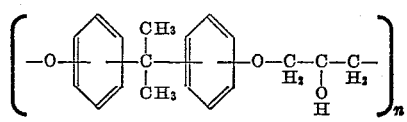

In the formula, $n$ is an integer of a value dependent upon the degree of resinification of the compound. The chain thus formed may be terminated at one or both ends by an epoxy group:

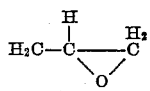

Many resins have also been prepared by condensing polyhydric alcohols, such as glycol, diethylene glycol, propylene glycol, glycerol, and pentaerythritol with saturated dicarboxylic acids such as adipic acid, succinic acid, phthalic acid, or the like, thus to provide long chain polyesters.

Still other polyester resins have been prepared by condensing with glycols, such as are above described, unsaturated polybasic acids, containing carbon-oxygen conjugation in the group:

Acids of this group include maleic acid, fumaric acid, itaconic acid, and mixtures of such acids with saturated acids of the first-mentioned type, all of which react with glycols to provide long chain polyesters with recurrent ethylenic groups. The polyesters containing such ethylenic groups are characterized by a capacity for reacting by addition through said groups with monomers containing a $>C=CH_2$ group, thus to obtain cross-linking with resultant formation of hard, insoluble, infusible products. Many such mixtures are disclosed in U.S. Patent No. 2,593,787 to Earl E. Parker.

In polyesters of both the saturated and unsaturated types it is possible to limit the growth of the polyester molecules by including a monocarboxylic acid (or a mixture of monocarboxylic acids such as those from glyceride oils) and including stearic acid, palmitic acid, linoleic acid, linolenic acid and others. These acids, if sufficiently unsaturated, in addition to acting as chain stoppers, also impart a capacity for air drying to the resultant polyester bodies.

This invention comprises the provision of a novel class of alkylidene carboxylic acids containing a di(hydroxyphenyl) grouping in a hydrocarbon chain and being useful for such purposes as the preparation of the glycidyl polyether resins, or as monocarboxylic acid chain stoppers in the various saturated and unsaturated alkyd resins, to which they impart added degrees of functionality.

The compounds prepared according to this invention may be represented by the formula:

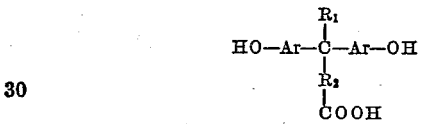

in which the group $R_1$ may be hydrocarbon, halogen, such as chlorine or the like, and $R_2$ is hydrocarbon, e.g. alkylene other than methylene and containing at least two carbon atoms such as ethyl, propyl, butyl, with either normal or branched chains and containing, for example, up to 10, 12 or even more carbon atoms. The Ar groups are aromatic rings. They may be unsubstituted, but one or both thereof can contain substituents such as alkyl (methyl, ethyl, propyl, butyl, isopropyl, isobutyl), halogen, (chlorine, bromine), nitro, sulfo, and others. These substituents as well as those in positions $R_1$ and $R_2$ will obviously influence the properties of the compounds, for example, by increasing or decreasing the compatability, solubility, boiling point, toxicity, bactericidal, fungicidal, insecticidal, and like properties. However, they are all useful and are included within the scope of this invention.

These compounds, it has now been found, can be prepared by reacting a phenolic compound containing one or more available hydrogen atoms in the aromatic ring with a carboxylic acid containing a keto group appropriately disposed in the carbon chain. Preferably, the reaction is conducted in the presence of a catalyst and notably of an acid, such as a relatively strong mineral acid, for example, hydrochloric acid, hydrobromic acid, phosphoric acid, sulfuric acid or the like. Polyphosphoric acid, which is a mixture of $H_3PO_4$ and $P_2O_5$, and which is a strong dehydrating agent, is not preferred because it tends to catalyze the production of phenyl esters in large quantities. However, even it may produce some di(hydroxyaromatic) alkylidene carboxylic acids from phenolic compounds and keto carboxylic acids.

The strong mineral acids are preferred, but the invention also includes the use of strong organic acids such as chloroacetic acid. Acids such as sulfuric acid, which tend to sulfonate phenolic compounds should be employed only at low temperatures, e.g., at or near room temperature, if maximum yields of the dihydroxyphenyl-alkylidene acids are desired.

The reaction is believed to proceed substantially in accordance with the following equation, wherein phenol is used for illustrative purposes:

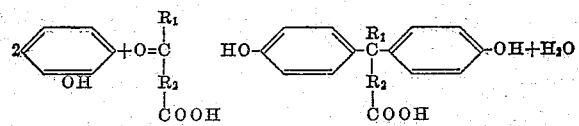

where $R_1$ and $R_2$ have the significance given hereinabove.

The course of this reaction is surprising, inasmuch as the hydroxyl of the phenolic compound and the carboxyl group of the acid are both reactive, yet do not take part in the reaction.

Typical phenolic compounds which may be employed in the foregoing reaction include phenol, cresol (ortho, meta, or para), carvacrol, thymol, such dihydric phenols as catechols, resorcinol, hydroquinone, and the like; likewise, trihydric phenols, such as pyrogallol. Homologues of dihydric phenols, such as orcinol may also be utilized. Still other phenols comprise the ethers containing phenolic groups and being represented by guaiacol, or creosol. Phenols are considered as comprising compounds in which a hydroxyl is substituted for hydrogen in an aromatic ring.

Keto acids, which in the presence of mineral acids will react as above described with phenolic compounds include acids such as levulinic acid, lactarinic acid, mesitonic acid, deltaketocaproic acid, geronic acid and the like. Beta-keto acids such as acetoacetic acid are not suitable for the reaction owing to the ready decarboxylation of β-keto acid. However, acids containing a keto group more remote from the carboxyl than the beta position may be employed.

The conditions of reaction utilized in the preparation of the foregoing di(hydroxyaromatic) alkylidene carboxylic acids are general in nature and are applicable to the various possible combinations of phenols and the keto acids.

In the pairing of the keto-carboxylic acids and the phenolic compounds it is preferable to select combinations in which the members are mutually soluble or compatible with each other or are soluble in a common solvent, at least at the temperatures at which the reaction is carried out. Such solubility, of course, assists in attaining rapid reaction. However, the invention also includes effecting contact between the phenolic compounds and the keto-acids by application of vigorous agitation, by emulsification, or by other methods of dispersion whereby the interface between the reactants is extended to a sufficient degree to obtain a reasonable degree of reaction.

Amounts of acids employed as catalysts in the foregoing reactions, usually are substantial, for example, about 5 to 50 percent by weight based upon the reactants present. More than the latter amount is usually uneconomical and is not required.

Reaction temperatures may range from room temperature upwardly but usually should not be much above steam bath temperature (90 to 100° C.), as side reactions may then occur to an objectionable degree.

The reaction time may be varied from one hour to several days, for example, 3 or 4 days or more, dependent upon temperature.

Application of the principles of the invention to the preparation of di(hydroxy aromatic) alkylidene carboxylic compounds is illustrated by the following examples:

EXAMPLE I

A mixture of 94 grams of phenol, 50 grams of levulinic acid, and 20 grams of concentrated hydrochloric acid was heated on the steam-bath with stirring for 6 hours. A clear solution of red color was obtained. This was cooled, washed with water, and a water-insoluble red oil, which was heavier than water was obtained. The oil was extracted with toluene to remove unreacted phenol in a yield of 35 grams. The portion insoluble in toluene was stripped at 90° C. under a pressure of 10 millimeters (absolute). The product was a reddish, viscous oil in a yield of 45 grams.

The product is insoluble in toluene, soluble in acetone and methanol, soluble in aqueous sodium carbonate and bicarbonate, and is precipitated by hydrochloric acid. The material is soluble in concentrated sulphuric acid to give a yellow solution of a water-soluble product.

The product of the reaction of one mole of levulinic acid and 2 moles of phenol is predominantly gamma, gamma p,p-di(hydroxyphenyl)-valeric acid (also known as 4,4-bis(4-hydroxyphenyl) pentanoic acid) of the structure:

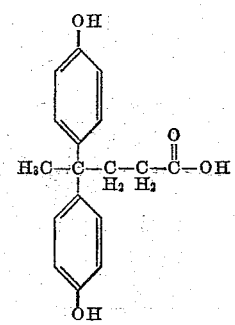

The compound depicted structurally hereinabove may be esterified with alcohols, such as methyl alcohol, to provide methyl esters or the like. These esters often are more stable than the corresponding acids. It is sometimes advantageous to form the ester and then to distill the latter to obtain separation from undesired impurities.

The gamma, gamma-di(hydroxyphenyl) valeric acid is susceptible of taking up aromatic hydrocarbons such as benzene and toluene to form a crystallizable material presumably containing the aromatic compounds in loosely combined form from which they are liberated when the crystalline material is heated above the melting point. One such crystalline compound containing toluene of crystallization is a white crystalline solid (M.P. 108–109° C.) and may be represented by the structure:

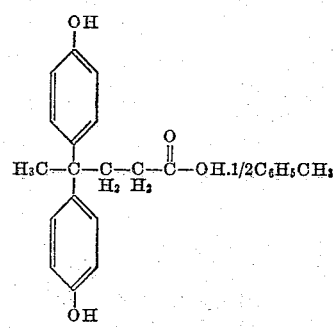

The di(hydroxyphenyl) alkylidene carboxylic acids, such as gamma, gamma-di(hydroxyphenyl) valeric acid prepared as above described or other di(hydroxyaromatic) alkylidene carboxylic acids, can be reacted in the presence of a base such as sodium hydroxide, with chlorides such as allyl chloride to form diallylether esters of the mono acids. These diallylethers can be heated to 250° C., thus effecting a Claisen rearrangement and subsequent polymerization to form hard, light, yellow resins of useful properties.

The di(hydroxyphenyl) alkylidene carboxylic acids such as gamma, gamma-dihydroxyphenylvaleric acid can also be converted to amides by conventional reactions of amidification with ammonia or with primary, or secondary amines such as ethyl amine, diethyl amine, aniline, diphenyl amine, phenylene diamine and the like.

Gamma, gamma-di(hydroxyphenyl) valeric acid or similar acids prepared as described by the foregoing method can be polymerized in alkaline solution with formaldehyde to form modified phenolic resins.

Di(hydroxyaromatic) alkylidene carboxylic acid esters such as the allyl or butyl esters, may be reacted in the presence of an alkali, with epichlorohydrin to form polyether type resins resembling those obtained by condensation of Bisphenol A and epichlorohydrin, but containing an added degree of functionality by reason of the presence of the carboxyl group.

Gamma, gamma-di(hydroxyphenyl) valeric acid and similar acids can also be employed as chain stoppers in the formation of alkyd resins, for example, they may be mixed with glycerol and phthalic anhydride and reacted in well-known manner to provide a modified alkyd resin which includes phenolic groups bound in the polyester molecules and being capable of undergoing the various reactions with formaldehyde and epichlorohydrin which have previously been discussed.

The dihydroxyphenylvaleric acid of this example can also be treated with alkali to form alkaline phenates which, subsequently can be reacted with chloroacetic acid to form diphenoxyacetic acid which, as will be observed, includes three carboxylic groups and is of use in forming polyester resins by reaction with glycerol or glycols.

EXAMPLE II

A mixture of 188 grams of phenol, 116 grams of levulinic acid, 150 milliliters of concentrated hydrochloric acid, and 75 milliliters of water was heated on a steam bath with stirring for a period of 20 hours. A red mixture was thus obtained which was cooled, diluted with water, and extracted with ether. The ether solution was washed with water and was extracted with a solution of 200 grams of sodium bicarbonate in 2500 grams of water.

The ether solution remaining as a residue was washed with water and stripped. The deep red oil remaining in an amount of 67 grams, was distilled at a pressure of 2 millimeters (absolute) and at a temperature of 60–75° C. to give 57 grams of unreacted phenol and 10 grams of red viscous oil as a residue.

The portion of the product taken up in the sodium bicarbonate solution was acidified with hydrochloric acid, was extracted with ether, washed and stripped by distillation to provide a product which was melted and poured into an evaporation dish. The yield was 156 grams (0.54 mole). The product had a melting point (soft) of 65° C. and flowed at 68° C. to 72° C. This product comprised gamma, gamma dihydroxyphenylvaleric acid in a yield of approximately 77 percent. Crystallization from toluene yielded white needles, M.P. 107° C.–108° C. This was gamma, gamma-dihydroxyphenylvaleric acid containing toluene of crystallization and was of the formula:

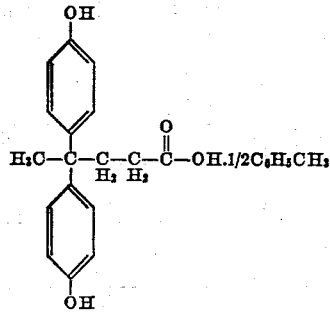

EXAMPLE III

In this example, three samples each comprising 94 grams of phenol, 58 grams of levulinic acid, 50 milliliters of concentrated hydrochloric acid, and 1 gram of beta-mercaptopropionic acid were made up and stirred for 5 hours. During this time the first sample was maintained at a temperature of 50° C. plus or minus 5°; the second was raised to 60° C. plus or minus 5°; the third was raised to 70 plus or minus 5 degrees C. They were cooled to room temperature and were then further stirred at room temperature overnight. Each of the samples was diluted with water, extracted with ether, and subsequently extracted with sodium bicarbonate as in the preceding examples to obtain gamma, gamma-dihydroxyphenylvaleric acid in relative purity. The products were tan in color and glass-like in appearance.

EXAMPLE IV

A mixture of 94 grams of phenol, 58 grams of levulinic acid, 20 milliliters of water and 90 grams of concentrated sulfuric acid was stirred at room temperature for 20 hours to provide an orange-red solution which when diluted with water was worked up by extraction with ether and subsequent extraction of the ether solution with aqueous sodium bicarbonate. There was obtained 40 grams of gamma, gamma-dihydroxyphenylvaleric acid in crude form. This was crystallized from acetone-toluene to yield 35.5 grams of a white and crystalline product. The melting point was 107° C. to 109° C., at which temperature, toluene of crystallization was evolved. All of the toluene was evolved to 110° C. or below, at a pressure of 0.5 millimeter of mercury (absolute). The product (a white glass) had a melting point of 80° C. to 82° C.

EXAMPLE V

The catalyst, in this instance, was sulfuric acid diluted with water. The reaction mixture comprised 94 grams of phenol, 58 grams of levulinic acid, and a solution of 180 grams of concentrated sulfuric acid, and 30 grams of water. The mixture was stirred at room temperature for 18 hours. There resulted a red mixture which, when diluted with water, was extracted with ether, and the ether extract was extracted with aqueous sodium bicarbonate. The solution of sodium bicarbonate was then acidified, extracted with ether, washed with water, and stripped to provide a glass-like product of light pink color in a yield of 80 grams. This product was gamma, gamma-dihydroxyphenylvaleric acid in high concentration.

The gamma, gamma-dihydroxyphenylvaleric acid was crystallized to yield the toluate melting at 107–108° C.

EXAMPLE VI

In this example, aqueous sulfuric acid was employed as a catalyst of a condensation in several samples.

Sample A

A mixture of 94 grams of phenol, 58 grams of levulinic acid, 35 grams of water, and 180 grams of concentrated sulfuric acid was stirred at room temperature for 18 hours. The resultant reaction product was then worked up with aqueous sodium bicarbonate and toluene as in the preceding examples. A yield of 75 grams of crude product was thus obtained. This product consisted essentially of gamma, gamma-dihydroxyphenylvaleric acid.

Sample B

The same procedure was repeated but with an increase of the water content of the system to 50 grams. The mixture was stirred at room temperature over a period of 2 days, after which it was cooled with Dry Ice-acetone mixture. Ice water was added and the mixture was extracted with ethyl-acetate, was further washed with water, and was extracted with saturated sodium bicarbonate to remove gamma, gamma-dihydroxyphenylvaleric acid.

The bicarbonate soluble extract, of light yellow color, and containing large amounts gamma dihydroxyphenyl-valeric acid salts, was acidified and extracted with ethyl acetate. The residue was washed and stripped by evaporation to provide an orange product of glass-like appearance in a yield of 77 grams.

EXAMPLE VII

A mixture of 94 grams of phenol, 58 grams of levulinic acid, 180 grams of concentrated sulfuric acid and 45 grams of water was stirred at room temperature for 20 hours. Water was then added, the mixture extracted with ethyl acetate and the ethyl acetate extract washed with water. The washed extract was then extracted exhaustively with aqueous sodium bicarbonate, washed again with water and then distilled to yield 25 grams of unreacted phenol. The bicarbonate extracts were combined, acidified with hydrochloric acid and extracted with ether. Evaporation of the ether left an almost colorless amorphous solid (82 grams), M.P. 79–82°, of essentially pure gamma, gamma-di(p-hydroxyphenyl)-valeric acid, of calculated hydroxyl and acid value. This dihydroxyphenyl-valeric acid is soluble in alcohol, acetone and ether, very sparingly soluble in toluene and water and insoluble in hexane. It crystallizes from aromatic hydrocarbons such as benzene, toluene and xylene and with one mole of the hydrocarbon per two moles of the acid. The acid with toluene of crystallization melts at 107–108° C.; with benzene of crystallization at 118–120° C. and with m-xylene at 95–97° C.

The gamma, gamma di-(hydroxyphenyl)-valeric acid obtained as a glass melting at 80–82° C. and characterized by its capacity of forming loose adducts with aromatic hydrocarbons, appears to be dimorphic. When concentrated solutions of the amorphous material in a mixture of toluene and acetone are allowed to evaporate slowly there is obtained a crystalline modification of the diphenol acid which, after crystallization from toluene-acetone or from water, melts at 170–172° C. When crystals of this are used to seed solutions of the amorphous material, the higher melting modification is obtained at once.

The methyl ester of gamma, gamma-dihydroxyphenyl-valeric acid prepared by refluxing the acid in methanol with a trace of mineral acid, is a crystalline solid, melting at 90° C.

EXAMPLE VIII

A diallylether of gamma, gamma-dihydroxydiphenyl-valeric acid derived by interacting allyl chloride and gamma, gamma-dihydroxydiphenylvaleric acid was heated at 250° C. to produce a Claisen rearrangement, whereby the allyl groups were transferred to the benzene rings in ortho relationship with respect to the hydroxyls of the phenols. The resultant phenolic compounds then polymerized to form hard, light-colored, yellow resins useful for coating purposes and for other applications.

It will be appreciated that in the foregoing examples, levulinic acid may be replaced by other keto acids which are not subject to decarboxylations, and being represented by gamma acetobutyric acid. The corresponding phenolic derivative is delta, delta dihydroxyphenylhexanoic acid. Still another example is 6 keto-n-octadecanoic acid, which can be reacted with various phenols as herein disclosed.

Other phenolic compounds which may be substituted for phenol in the examples comprises carvacrol or butenylphenol which forms di(hydroxybutenylphenyl) valeric acid; or catechol (the corresponding product is gamma, gamma-di(orthodihydroxyphenyl) valeric acid; or guaiacol (the corresponding product is gamma, gamma bis(hydroxymethoxyphenyl)-valeric acid.

The forms of the invention herein shown and described are to be considered as being by way of illustration. It will be apparent to those skilled in the art that numerous modifications may be made therein without departure from the spirit of the invention or the scope of the appended claims.

I claim:
1. A compound of the structure

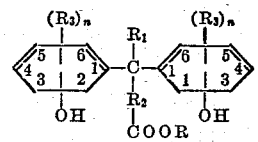

wherein R is a member of the class consisting of hydrogen and lower alkyl radicals, $R_1$ is an alkyl radical, $R_2$ is an alkylene radical containing at least 2 carbon atoms, $R_3$ is a lower alkyl radical, and $n$ is a number selected from the class consisting of 0, 1 and 2, the hydroxyl groups being attached to the 4-position of the ring structure when $n$ is 0.

2. 4,4-bis(4-hydroxyphenyl)pentanoic acid.
3. Methyl-4,4-bis(4-hydroxyphenyl)pentanoate.
4. The method which comprises reacting a phenol of the structure

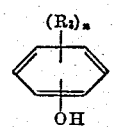

wherein $R_3$ is a lower alkyl radical and $n$ is a member selected from the class consisting of 0, 1 and 2, with a keto-carboxylic acid of the structure

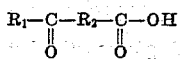

wherein $R_1$ is an alkyl radical and $R_2$ is an alkylene radical containing at least 2 carbon atoms, in the presence of a mineral acid and at a temperature in the range of about 25° C. to about 100° C., and recovering from the reaction mixture a compound of the structure

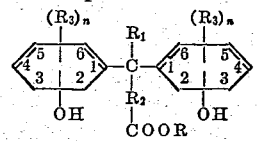

wherein $R_1$, $R_2$, $R_3$, and $n$ have the significance set forth hereinabove, the hydroxyl groups of said compound being attached to the 4-position of the ring structure when $n$ is 0.

5. The method of claim 4 wherein the phenol is utilized in an amount of at least about 2 moles per mole of the keto-carboxylic acid.

6. The method of claim 5 wherein the mineral acid is hydrochloric acid.

7. The method of claim 6 wherein beta-mercapto-propionic acid is admixed with the hydrochloric acid.

8. The method which comprises reacting phenol with levulinic acid in the presence of a mineral acid catalyst, and at a temperature in the range of about 25° C. to about 100° C., and recovering 4,4-bis(4-hydroxyphenyl) pentanoic acid from the reaction mixture.

9. The method of claim 8 wherein the phenol is utilized in an amount of about 2 moles per mole of levulinic acid.

10. The method of claim 9 wherein the mineral acid catalyst is hydrochloric acid.

11. The method of claim 10 wherein the hydrochloric acid is utilized in admixture with beta-mercaptopropionic acid.

References Cited in the file of this patent

FOREIGN PATENTS 362,382    Germany _____ Oct. 29, 1922

OTHER REFERENCES

Hunter et al.: Chem. Ab., vol. 43, p. 613 (1949).
Richter: The Chemistry of the Carbon Compounds, vol. III, p. 556, Third English edition (1946).

UNITED STATES PATENT OFFICE
Certificate of Correction

Patent No. 2,933,520            April 19, 1960

Alfred R. Bader

It is hereby certified that error appears in the printed specification of the above numbered patent requiring correction and that the said Letters Patent should read as corrected below.

Column 3, lines 3 to 9, the formula should appear as shown below instead of as in the patent:

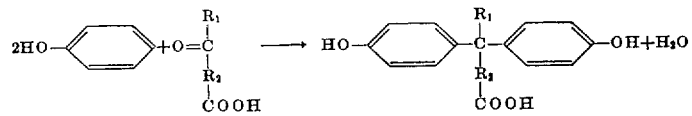

column 4, line 64, for "di(hydroxyaromatic" read —di(hydroxyaromatic)—; column 8, lines 5 to 10, claim 1, the formula should appear as shown below instead of as in the patent:

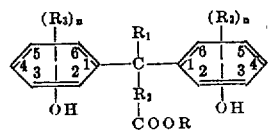

lines 37 to 42, claim 4, the formula should appear as shown below instead of as in the patent:

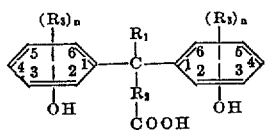

same column 8, list of references cited, under "FOREIGN PATENTS", add the following:

189,190    Great Britain _____ Nov. 20, 1922 same list of references cited, under "OTHER REFERENCES", add the following:
    Bader (I): J. American Chemical Society, v. 75, pages 5416–5417, Nov. 5, 1953.
    Bader (II): J. American Chemical Society, v. 76, pages 4465–4466, Sept. 5, 1954.
    Bottinger: Berichte, vol. 16, pp. 2071–2075 (1883).
    Prigge et. al.: Arb. Paul Ehrlich Inst. und George-Speyer-Haus und Ferdinand Blum Inst., Frankfurt A.M., No. 10, p. 85 (1951).

Signed and sealed this 18th day of October 1960.

[SEAL]

Attest:
KARL H. AXLINE,
*Attesting Officer.*

ROBERT C. WATSON,
*Commissioner of Patents.*